United States Patent Office 3,836,583
Patented Sept. 17, 1974

3,836,583
MANUFACTURE OF KETENE
Guenther Matthias and Gerhard Schulz, Ludwigshafen, Werner Kasper, Frankenthal, and Klaus Feind, Limburgerhof, Germany, assignors to Badische Anilin- & Soda-Fabrik Aktiengesellschaft, Ludwigshafen (Rhine), Germany
No Drawing. Filed Nov. 30, 1971, Ser. No. 203,452
Claims priority, application Germany, Dec. 2, 1970, P 20 59 292.1
Int. Cl. C07c 49/22
U.S. Cl. 260—585.5        10 Claims

ABSTRACT OF THE DISCLOSURE

Manufacture of ketene by thermal dissociation of acetic acid at reduced pressure and in the presence of catalysts using a prescribed ratio of reactor volume to the internal surface area of the reactor and to the volume of acetic acid feed.

---

The product may be used for numerous syntheses, including those requiring maximum purity. It may be used as an acetylating agent and as an intermediate in the preparation of $\alpha,\beta$-unsaturated ketones, enol acetates, isopropenyl acetate, $\beta$-lactones and thus of plastics materials, synthetic resins and fibers.

This invention relates to a process for the manufacture of ketene by thermal dissociation of acetic acid at reduced pressure and in the presence of catalysts using a prescribed ratio of reactor volume to the internal surface area of the reactor and to the volume of the acetic acid introduced.

Numerous publications disclose the manufacture of ketene by thermal dissociation of acetic acid in the presence of catalysts, in particular alkyl phosphates (U.S. Pats. 2,249,543 and 2,820,058; Ullmanns Enzyklopädie der Technischen Chemie, Vol. 9, p. 537 et seq. and Vol. 6, p. 806 et seq.). One usual process consists in evaporating the acetic acid in vacuo at from 0.1 to 0.9 atmosphere and adding vaporous 0.3% w./w. triethyl phosphate to the acetic acid vapor followed by heating the mixture of vapors to a temperature of from 650° to 850° C. for from 0.2 to 2 seconds, during which operation the acetic acid largely dissociates into ketene and water, after which 0.1% w./w. ammonia is added to the hot gas and the whole is cooled to about 10° C. to condense the water and unreacted acetic acid, the condensate then being separated. The conversion rate and the yield and purity of the ketene depend on a number of factors, including the type of reactor used. The efficiency of a reactor in turn depends on various factors such as the material of the reactor, the method of feeding the acetic acid and catalysts, the size of the reactor, the pressure and temperature in the reactor, the shape of the reactor, and the heating means used. Thus the manufacture of ketene is governed by a large number of factors which influence each other and the effect of which cannot be assessed quantitatively. One important factor is the heating rate. The gas mixture should be heated to the desired dissociation temperature as rapidly as possible in order to minimize residence times and also minimize decomposition of the ketene formed. A high heating rate may be achieved by using high wall temperatures, but the ketene is then preferentially decomposed at the wall and carbon is formed:

The carbon reduces the heat transfer effect, which necessitates even higher wall temperatures, which in turn decompose the ketene even faster.

None of the prior art processes has been able, particularly in large-scale operations, to meet fully the requirement of effecting control of the temperature profile in the reactor at minimum wall temperatures so that the yield and purity of the ketene and the space-time yield are at a maximum and carbonization of the reaction mixture is kept low.

It is an object of the invention to provide a new process for the manufacture of ketene which gives better overall results with regard to yield, space-time yield and purity of the ketene produced.

We have now found that ketene may be advantageously prepared by thermal dissociation of acetic acid at reduced pressure and in the presence of catalysts, if the dissociation of the acetic acid is effected in a reactor having a ratio of internal surface area to volume of from 200 to 1,000:1, the ratio of the volume of the reactor to the volume of acetic acid fed to the reaction chamber per hour being from 0.5 to 5:1.

The reaction may be represented by the following equation:

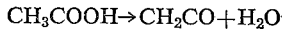

Compared with prior art processes, our new process provides better overall results as regards yield, space-time yield and purity of the ketene produced. The amount of carbon deposit on the walls of the reactor is less. The crude gas obtained has a higher ketene content, and the temperature of the heating medium may be lower, which reduces the loss of heat due to radiation.

By volume of acetic acid fed to the reaction chamber per hour we mean the volume of liquid acetic acid (calculated 100%). The acetic acid is usually used in a concentration of from 85 to 100% by weight. Before entering the reaction chamber, the acetic acid is generally vaporized by means of an evaporator. Conveniently, the catalysts used are gaseous phosphoric acid compounds, for example phosphoric acid esters, or liquid compounds such as phosphoric acid, triethyl phosphate and tricresyl phosphate. Usually, the liquid catalysts are also vaporized. The gaseous or vaporized catalyst is then fed to the reactor in admixture with the vaporous acetic acid. The amount of catalyst used is usually from 0.1 to 0.5% by weight, based on acetic acid, the catalyst preferably being triethyl phosphate. Following dissociation, it is convenient to add from 0.08 to 0.2% of ammonia to the hot gas.

Dissociation is generally carried out continuously at a temperature of between 650° and 820° C. and preferably between 700° and 750° C. and at a pressure of between 0.1 and 0.9 atmosphere and preferably between 0.2 and 0.5 atmosphere. Conveniently, the reactors used for the dissociation are reaction tubes. The material of which the reactors are made may be any of the metals and alloys previously used for the synthesis of ketene, for example stainless steel (V2A, V4A), "Sicromal" steel and copper. The tubes may also be provided with a protective lining if desired.

The invention is based on the realization that specific dimensions and thus a specific shape of the reaction chamber is of particuar importance in conjunction with other reaction conditions, particularly the internal surface area of the reaction chamber and the volume of acetic acid fed thereto per hour. The ratio of internal surface area in square meters to the reactor volume in cubic meters in the present invention is from 200:1 to 1,000:1 and preferably from 200:1 to 400:1 and the ratio of reactor volume to the volume of liquid acetic acid fed thereto per hour in cubic meters is from 0.5 to 5:1 and preferably from 1 to 2:1. As a rule, the internal surface area corresponds to the area of heated wall of the reaction chamber and the reactor volume corresponds to the internal volume of a reaction tube.

In a preferred embodiment of the process, reaction tubes having a slot-like cross-section (flat tubes) are used in place of round tubes. The cross-section of the tube is defined by the wall of the tube. Tubes may be used which have a semi-circular, semi-elliptical or fully elliptical cross-section, or a cross-section in the form of a narrow rectangle which is preferably rounded at the corners. Particularly advantageous is a tube cross-section which is in the form of a narrow rectangular gap of which the short sides are in the form of semi-circles, the radius of each semi-circle being equal to half the length of a short side. The ratio of height to width of the cross-section of said tube is advantageously between 1:100 and 1:3 and preferably between 1:30 and 1:8.

Alternatively, finned tubes can be used, particularly those having from 4 to 20 and especially from 8 to 12 fins around the circumference of the tube on the inside thereof and extending in the longitudinal direction. The fins are usually uniformly spaced and the ratio of the height of each rib (as measured from the tube wall to the apex of the rib) to the internal radius of the tube (as measured from the center of the tube to the tube wall) is from 1:2 o 1:25. The width of each fin is generally the same along the entire length of the tube in the reaction zone and its ratio to the height of the rib is conveniently frtm 1:2 to 1:5. If desired, the fins may taper toward their apex, for example the base of the ribs may be from 5 to 20 times thicker than the apex of the ribs.

A particularly preferred embodiment of the process makes use as the reaction chamber of an annular gap produced by placing one round tube inside another round tube of larger diameter. The width of the annular gap is the same at all points and its ratio to the length of the reactor (length of tube) is advantageously from 1:100 to 1:50,000 and preferably from 1:400 to 1:4,000 and the ratio of the gap width to the internal diameter of the outer tube is from 1:5 to 1:100.

The reaction and working up of the reaction mixture may be carried out in the manner described above or, if desired, modified in the manner described in the cited publications. For example, ammonia or ammonium salt may be added to the feedstock or the reaction mixture before cooling. Similarly, the operations of cooling the reaction mixture, condensing the acetic acid, acetic anhydride and water and subsequent washing of the crude ketene may be varied in known manner. The ketene gas contains impurities consisting of methane, carbon dioxide, carbon monoxide, ethylene, propene, butadiene, butyne, hydrogen and the vapors of water, acetic acid and acetic anhydride. These imprities are contained in the product ketene in lower concentrations than in the products of prior art proecsses, the composition being for example 89.8% v./v. of ketene, 0.2% v./v. of water vapor, 0.1% v./v. of vapors of acetic acid and acetic anhydride, and 9.4% v./v. of gaseous impurities (inert gas). The ketene produced by the process of the invention may be used for numerous syntheses, including those demanding ketene of maximum purity. For information on the uses of ketene, see the cited passages in Ullmanns Enzyklopädie.

EXAMPLE 1 (Annular gap reactor)

The reactor consists of two stainless steel tubes placed one inside the other, the external diameter of the inner tube being 3 cm. and the internal diameter of the outer tube being 4 cm. The reactor is 5 m. long. The volume of the reactor is 2.75 l. and its internal surface area is 1.88 m$^2$. The ratio of the gap width to the internal diameter of the outer tube is 1:8, the ratio of the gap width to the length of the tube is 1:1,000 and the ratio of the internal surface area to the reactor volume is 680 m.$^{-1}$. The reactor is heated with gas heated to 800° C. and circulated countercurrently. A mixture of acetic acid vapor and 0.3% w./w. of triethyl phosphate is fed to the annular gap of the reactor. The rate of feed of the acetic acid is 1.8 kg./hr. The pressure in the reactor is 0.15 atm. and the temperature is 730° C. The reaction mixture is then mixed with 1 g./kg. of ammonia and cooled to 10° C. Water, unreacted acetic acid and acetanhydride condense. There are obtained 916 g./hr. of ketene and an inert gas mixture (52 g./hr.) consisting of carbon monoxide, ethylene, methane and carbon dioxide. The conversion of acetic acid, calculated on the basis of the condensed mixture of acetic acid and water (798 g./hr. containing 48.5% by weight of acetic acid) is 78%. The yield is 93.2% of theory based on acetic acid converted. The crude ketene gas consists of 89.8% v./v. of ketene and 10.2% v./v. of off-gas.

EXAMPLE 2 (Rectangular gap)

The reactor consists of three tubes having a slot-like cross-section having a width of 7 cm. and a height of 0.8 cm. The length of the reactor is 5 m. The total volume is 8.4 l. and the internal surface area is 2.33 m.$^2$. The ratio of the height of the gap to its width is 1:8.8, the ratio of the height of the gap to the length of the reactor is 1:625 and the ratio of the internal surface area to the reactor volume is 290 m.$^{-1}$. The reactor is heated with gas heated to 870° C. and circulated countercurrently. The higher temperature of the circulated gas is necessary to obtain a reaction temperature of 730° C. The reaction and working up of the reaction mixture are carried out as described in Example 1. The rate of feed of the acetic acid is 10 kg./hr. The reaction pressure is 0.11 atm. There are obtained 5.29 kg./hr. of ketene and 0.37 kg./hr. of inert gas. The conversion, as calculated on the basis of the condensate (4.27 kg./hr. containing 42.2% w./w. of acetic acid) is 82% and the yield of ketene is 92.1% of theory based on acetic acid converted. The crude ketene gas consists of 11.9% v./v. of off-gas and 88.1% of ketene.

EXAMPLE 3 (Comparative Example)

(Reactor of round cross-section)

The reactor consists of a stainless steel tube having a diameter of 4 cm. and a length of 5 m. The volume is 6.25 l. and the internal surface area is 0.625 m.$^2$. The ratio of gap width to reactor length is 124 and the ratio of the internal surface area to the reactor volume is 100 m.$^{-1}$. The reactor is heated with countercurrently circulated gas having an inlet temperature of 930° C. The ratio of reactor volume to the volume of acetic acid fed per hour is 0.7. The reaction and working up of the reaction mixture are carried out as described in Example 1. The feed of acetic acid is effected at a rate of 9 kg./hr. The reaction pressure is 0.11 atm. and the temperature is 730° C. There are obtained 3.44 kg./hr. of ketene and 0.65 kg./hr. of inert gas. The conversion is 68%, the condensate (4.72 kg./hr.) consisting of 61% acetic fed in and the crude ketene contains 72.6% v./v. of ketene.

We claim:
1. A process for the manufacture of ketene by thermal dissociation of vaporized acetic acid at reduced pressure and in the presence of catalysts, wherein said dissociation is carried out in a reactor having a ratio of internal surface area to reactor volume of from 200:1 to 1,000:1 and a ratio of reactor volume to volume of liquid acetic acid fed thereto per hour of from 0.5 to 5:1.

2. A process as claimed in claim 1, wherein dissociation is carried out at a temperature of between 650° and 850° C.

3. A process as claimed in claim 1, wherein dissociation is carried out at a temperature of between 700° and 750° C.

4. A process as claimed in claim 1, wherein dissociation is carried out at a pressure of between 0.2 and 0.5 atmosphere.

5. A process as claimed in claim 1, wherein dissociation is carried out in a reactor having a ratio of internal surface area in square meters to reactor volume in cubic meters of from 200:1 to 400:1.

6. A process as claimed in claim 1, wherein dissociation is carried out in a reactor having a ratio of reactor volume to volume of liquid acetic acid fed to the reaction chamber per hour of from 1 to 2:1.

7. A process as claimed in claim 1, wherein dissociation is carried out in an annular gap of a reactor having two concentric tubes with said annular gap therebetween, the ratio of gap width to reactor tube length being between 1:100 and 1:50,000 and the ratio of gap width to internal diameter of the outer tube being between 1:5 to 1:100.

8. A process as claimed in claim 1, wherein dissociation is carried out in annular gap of a reactor having two concentric tubes with said annular gap therebetween, the ratio of gap width to reactor tube length being between 1:400 and 1:4,000 and the ratio of gap width to internal diameter of the outer tube being between 1:5 and 1:100.

9. A process as claimed in claim 1, wherein dissociation is carried out in a reactor having a ratio of height to width of its cross-section of between 1:100 and 1:3.

10. A process as claimed in claim 1, wherein dissociation is carried out in an annular gap of a reactor having to width of its cross-section of between 1:30 and 1:8.

References Cited

UNITED STATES PATENTS

| | | | |
|---|---|---|---|
| 3,378,583 | 4/1968 | Van Bogaert | 260—585.5 |
| 2,053,286 | 9/1936 | Greenwalt | 260—585.5 |
| 2,653,859 | 9/1953 | Glaeser | 260—585.5 |
| 2,820,058 | 1/1958 | Luke et al. | 260—585.5 |

LEON ZITVER, Primary Examiner

N. MORGENSTERN, Assistant Examiner

U.S. Cl. X.R.

252—372; 260—676 R; 423—415, 449

UNITED STATES PATENT AND TRADEMARK OFFICE
CERTIFICATE OF CORRECTION

PATENT NO. : 3,836,583
DATED : September 17, 1974
INVENTOR(S) : Guenther Matthias, Gerhard Schulz, Werner Kasper and Klaus Feind It is certified that error appears in the above-identified patent and that said Letters Patent are hereby corrected as shown below:

Column 3, line 26, "frtm" should read --from--.

Column 4, line 54, "acetic fed" should read --acetic acid fed--.

Column 6, line 5, "carried out in an annular gap of a reactor having to width of its cross-section of between 1:30 and 1:8" should read --carried out in a reactor having a ratio of height to width of its cross-section of between 1:30 and 1:8--.

Signed and sealed this 15th day of July 1975.

(SEAL)
Attest:

RUTH C. MASON
Attesting Officer

C. MARSHALL DANN
Commissioner of Patents
and Trademarks